Patented Feb. 13, 1934

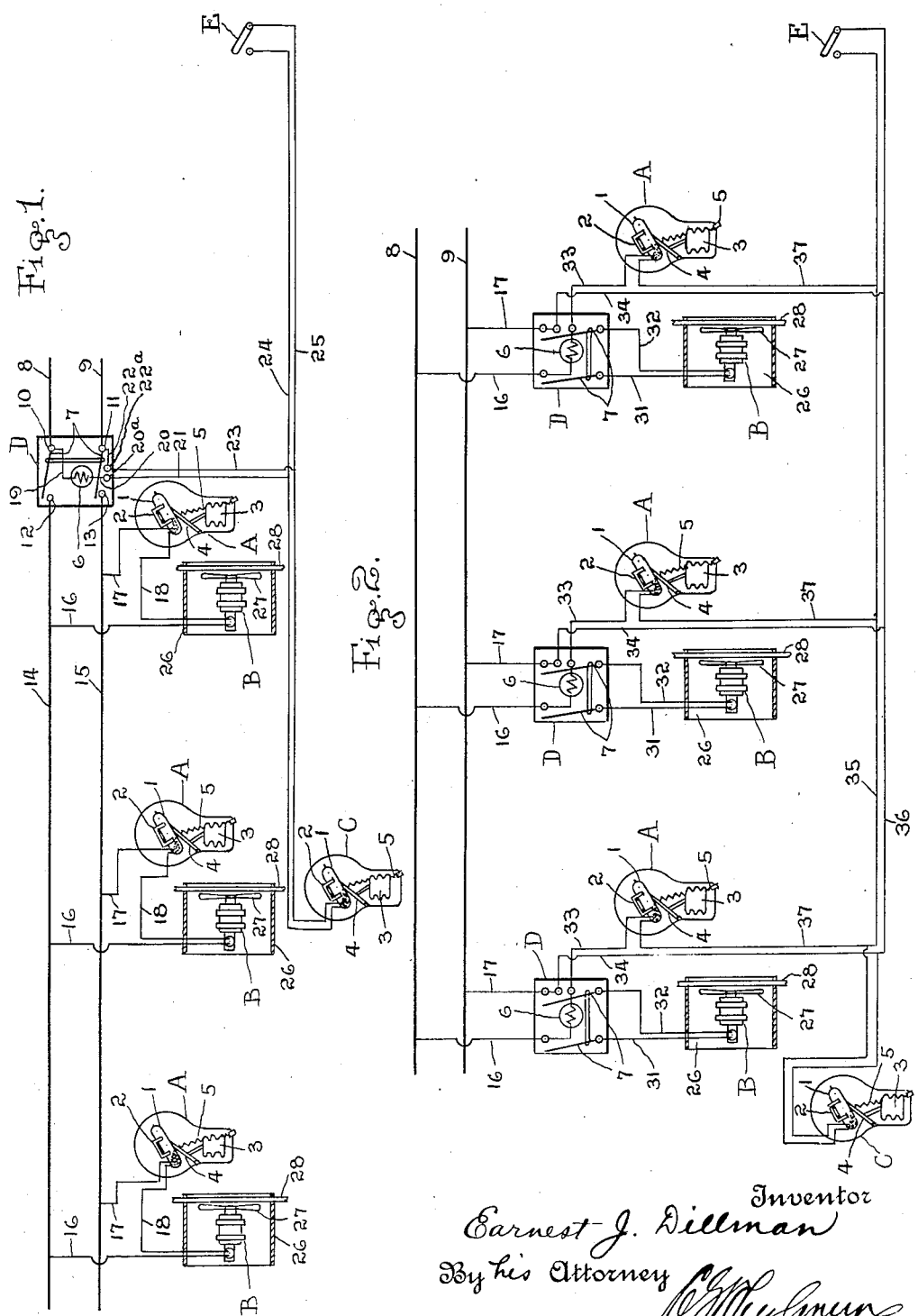

1,946,842

UNITED STATES PATENT OFFICE 1,946,842

TEMPERATURE CONTROL SYSTEM

Earnest J. Dillman, Detroit, Mich., assignor to Detroit Lubricator Company, Detroit, Mich., a corporation of Michigan Application May 29, 1930. Serial No. 456,959

12 Claims. (Cl. 236—47)

My invention relates to new and useful improvements in control apparatus, and more particularly to an apparatus or system for controlling temperature or atmospheric conditions in a room or rooms, or the like.

An object of my invention is to provide an apparatus or system by which a driving means, such, for example, as an electric motor, can be automatically started and stopped in response to variations in room temperature.

Another object is to provide a system which may be set to maintain a predetermined room temperature during a certain period or periods of time, and which may be set to maintain a different room temperature during another or other periods of time.

Another object is to provide an apparatus or system which is of simple construction, easily installed, and efficient in operation.

The invention consists in the improved apparatus or system, to be more fully described hereinafter, and the novelty of which will be particularly pointed out and distinctly claimed.

In the accompanying drawing, to be taken as a part of this specification, I have fully and clearly shown two embodiments of my invention, in which drawing—

Figure 1 is a diagrammatic view of a system embodying my invention, and

Fig. 2 is a diagrammatic view of another system also embodying my invention.

Referring to the drawing by characters of reference, A designates a temperature responsive or thermostatic control means or switch, a plurality of which are shown, each of which individually controls, in a manner to be described, a driving means or electric motor designated B, a plurality of which are shown. Although I have shown each switch A as only controlling or governing a single motor B, it is to be understood that each switch A may be operatively connected to control one or more motor means B, the additional electrical connections therefor being simple and well known by any skilled mechanic. The temperature responsive or thermostatic control means or switch C is operative, as will be described, to control or govern one or more of the driving means B. Each of the switches A and C is preferably such as is shown and described in the patent granted to Lewis W. Eggleston, No. 1,734,205, dated Nov. 5, 1929, though other switches intended to accomplish the same function may be used in lieu thereof. Each switch includes a mercury tube contact switch member 1, which is carried rigidly by a support member 2 pivoted to swing or tilt in a vertical plane in response to expansion or contraction of a thermostatic element 3 which is operatively connected to the member 1 by a linkage or leverage means 4, thus acting to make or break contact and the electric circuit. Each switch has a regulating spring means 5 by which the response of the element 3 to temperature change may be regulated, and by means of which the elements 3 of the switches A may be readily set to respond to a different temperature from each other, and particularly from the element 3 of switch C. Automatic switches D are also provided, which are controlled by the switches C and E of Fig. 1, or by the switches A, C and E of Fig. 2, and which are preferably—for example, of the type known as "Enclosed Automatic Motor Starters", manufactured by Cutler-Hammer Mfg. Co., Milwaukee, Wisconsin. Each of these automatic switches D is preferably of the magnetic type, having a magnet 6 which, when energized serves to attract the switch blades 7 to close the switch, the switch blades opening by gravity and a small spring force (not shown), when the circuit through the thermostatic switches is broken.

Referring to Fig. 1, which illustrates a system in which the load of each motor B may be safely carried by its switch 1, the characters 8, 9 designate the line wires leading from a source of electromotive force, either A. C. or D. C., which are connected to the switch blade terminals 10, 11 of the automatic switch D. From the switch contacts 12, 13 extend line wires or leads 14, 15, from which extend a plurality of sets of leads 16, 17, respectively. Since the apparatus electrically connected to and controlled through each of the sets of leads 16, 17 is substantially identical, a description of one such apparatus will suffice for all. The lead 16 is electrically connected to the motor or driving means B, while the lead 17 extends and is connected to one terminal or contact of the mercury switch tube 1 of switch A. From the other contact of the tube 1, a lead or conductor 18 extends to the remaining terminal of the motor means B. Extending from terminal 10 is a conductor 19 which connects to the magnet 6 from which extends a lead 20 to a binding post or the like 20ᵃ from which extends a conductor 21. The blade terminal 11 is connected by a wire 22 to a binding post or the like 22ᵃ, from which extends a conductor 23. The switch C, above referred to, is electrically connected in parallel circuit by the leads or conductors 24, 25, with another switch designated E, which may be a manually operable knife blade switch, as shown, or an automatically operated switch. The leads 24, 25 are respectively joined to the leads 21, 23. The motor means B is preferably housed in an open-ended casing 26 and has a fan or air blast means 27 driven thereby. Positioned within the casing 26 is a heat exchange means 28 for either giving off or absorbing sensible heat, and which is preferably in the form of a pipe or pipe coil or conduit to receive a heating or a refrigerating medium from a source of supply, not shown.

The operation of the system shown in Fig. 1 is as follows: Each of the switches A is set by its regulating means 5 so that the element 3 will act at a predetermined high temperature of, say, for example, about seventy degrees Fahrenheit, to tilt the tubes 1 clockwise of Fig. 1 and thereby break the circuit between leads 17 and 18. The means 5 of switch C is preferably set at a lower predetermined temperature of, say, for example, about fifty degrees Fahrenheit, so that response of element 3 of switch C to this temperature will act to tilt its tube 1 clockwise of Fig. 1, thus breaking the circuit between lead wires 21 and 23. The switch E is a control means which is operative to place either the switches A or the switch C in control of the motor means B. During that period when it is desired that high temperature prevail in the compartment or space served by means 28, the switch E will be closed, thereby short-circuiting the satisfied or open switch C which is in parallel circuit therewith, or acting to shunt the current flow therearound, to close circuit through leads 20, 21 and magnet 6 to close and maintain closed the switch D. When the temperature in the room about any one of the switches A drops below the high temperature limit, the tube 1 in the responding switch A will be tilted counterclockwise to close the circuit between its leads 17 and 18, and current will then flow from lead 8 through leads 14, 16 to the motor means B, thence via lead 18, the mercury in tube 1, leads 17, 15 and switch D to lead 9 of the line. The running motor means B will drive its fan member or air blast means 27, causing the air to flow through the casing 26 from left to right of Fig. 1 and over the exchange means 28, which if supplied with a heating medium will cause the temperature of the room to rise. When the element 3 of the running motor means B is satisfied by the room temperature, expansion of the element will tilt the tube 1 clockwise of Fig. 1, thus breaking the circuit through its motor means B at leads 17, 18 to thereby stop the circulation by the means 27 of the heated air or room atmosphere. It will be noted that the switch C has been in "off" position during this period, i. e., the thermostat 3 of switch C has remained satisfied by the high temperature, but the circuit through magnet 6 was maintained through switch E. During another period when it is desired to maintain a lower temperature in the room or compartment, the switch E is opened, as shown in Fig. 1, which places the switch C in control of switch D, and the thermostatic element of switch C being set to break the circuit at a lower temperature than are the elements 3 of switches A, the elements 3 of switches A will maintain their individual motor circuits closed and give way to control of all the motor circuits simultaneously by the element 3 of switch C. When the switch C is calling for heat, i. e., its element 3 has not been satisfied, then the mercury in its tube 1 will complete the circuit between leads 21 and 23 and current will flow from line 8 through lead 19, magnet 6, leads 20, 21, 24, switch C, leads 25, 23 and 22 back to lead 9 of the line. Flow of current through magnet 6 under control of switch C will close switch D, and switches A being closed as their elements 3 are all calling for heat, and all of motor means B will be energized. When the element 3 of switch C becomes satisfied, then the magnet circuit from line leads 8, 9 will be broken in the tube 1 of switch C, releasing the spring and gravity opened switch blades 7 of switch D from attraction by magnet 6, thus breaking all of the motor circuits 16, 17. It will be noted that switch C controls motor means B through the switch magnet 6, as normally the load of more than one means B would be too great for a single switch tube 1.

In Fig. 2 I have shown another arrangement for accomplishing the same result as the system of Fig. 1, but in which the motor means B draws too great a current for insertion of switch A directly in the motor circuit, and which is as follows: Each motor means B is in series circuit by means of leads 31, 32 with the blades of a magnetic or automatic switch D and in parallel circuit by means of leads 33, 34 with its high temperature control means A, the lead wire 33 being connected to one contact of tube 1. Each of means A is in series circuit with the magnet 6 of its respective switch D, the magnet being in lead 33. A temperature responsive or automatic switch C is in parallel circuit by means of leads or lead wires 35, 36 with a manual switch E, which if desired, may be automatically controlled, as, for example, by a time mechanism (not shown). The circuit 35, 36 is in series circuit with switches A by means of lead wire 34 and a wire 37 extending to the other terminal or contact of tube 1. The switches A and C are set by means 5 at predetermined temperatures, high and low, respectively, such as are the similar switches of Fig. 1. When the switch E is closed, the switch C is short-circuited or shunted and the switches A are in control of their individual switches D, and when the switch E is open, the switch C is in series circuit with switches A, and being set to break circuit at a lower temperature than switches A, switch C will assume control of the magnetic switches D. The control circuit when switch E is closed is from line wire 8 through lead 16, magnet 6 and lead 33, mercury in tube 1, leads 37, 36, 35, switch E (switch C being satisfied and therefore open), leads 34 and 17 to line wire 9. The motor circuit is from lead 16 through one blade 7 of switch D to lead 31, motor means B, lead 32, and the other switch blade 7 to lead 17. When switch E is open the motor circuit is unchanged, but switch C replaces switch E functionally and structurally to control current flow between lead wires 35 and 36. The heat exchange means of Fig. 1, as 26, 27, 28, are also employed in the system of Fig. 2, and therefore they bear similar reference characters.

The switches A may be regulated independently, and therefore it is apparent that switches A may be set to maintain different degrees of temperature which are higher than that for which switch C is set. It is also obvious that the heat exchange means may be supplied with refrigerating medium, under which condition the switches A would be set or regulated to provide a lower temperature than the switch C, as it would then be desired to accurately maintain adjacent the heat exchange means a predetermined low temperature, or different degrees of low temperature, adjacent each heat exchange means, while the switch C would be set to permit the temperature adjacent the heat exchange means to rise to a predetermined cold high limit.

What I claim and desire to secure by Letters Patent of the United States is:

1. A control system comprising a unit heat exchange means having air blast means and a motor for driving said blast means, an electric circuit for energizing said motor, an electric switch controlling said circuit, a thermostat connected to said switch and operable when satisfied to open said switch, a second electric switch controlling said circuit, a second thermostat connected to said second-named switch and operable when satisfied to open said second-named switch, said first-named switch and said second-named switch being connected in series circuit whereby either of said thermostats is operable to break said motor circuit, and means operable to short-circuit said second-named switch.

2. A control system comprising a unit heat exchange means having air blast means and a motor for driving said blast means, an electric circuit for energizing said motor, an electric switch controlling said circuit, a thermostat connected to said switch and operable when satisfied to open said switch, a second electric switch controlling said circuit, a second thermostat operatively connected to said second-named switch and being satisfied at a predetermined lower temperature than said first-named thermostat, said second-named thermostat acting when satisfied to open said second-named switch, said first-named switch and said second-named switch being connected in series circuit, and means operable to short-circuit said second-named switch.

3. A control system comprising a unit heat exchange means having air blast means and a motor for driving said blast means, an electric circuit for energizing said motor, electric automatic switch means responsive to a predetermined high temperature, electric automatic switch means responsive to a predetermined low temperature, said first-named and said second-named switch means being electrically connected in series circuit and operable to make and break said motor circuit, and means to cut said second-named switch means out of said series circuit.

4. A control system comprising a unit heat exchange means having air blast means and a motor for driving said blast means, an electric circuit for energizing said motor, electric switch means responsive to temperature changes and operable to make and break said circuit, a second electric switch means responsive to temperature changes and operable to make and break said circuit, a third electric switch means, said second-named and said third-named switch means being electrically connected in parallel circuit, and said parallel circuit being electrically connected in series circuit to said first-named switch means whereby operation of said third-named switch means will place said motor under control of either said first-named or said second-named switch means.

5. A control system comprising a unit heat exchange means having air blast means and a motor for driving said blast means, an electric circuit for energizing said motor, automatically operable electric switch means controlling said circuit, a thermostatic electric switch controlling said switch means, a second thermostatic electric switch controlling said switch means, and a second electric switch means electrically connected in parallel circuit with said second-named thermostatic switch, said parallel circuit being connected in series circuit to said first-named thermostatic switch, whereby operation of said second-named switch means will place said first-named switch means under control of either said first-named or said second-named thermostatic switch.

6. A control system comprising a unit heat exchange means having air blast means and a motor for driving said blast means, an electric circuit for energizing said motor, an automatic switch in said circuit, a plurality of thermostatic switches, certain of said thermostatic switches being operable to control said automatic switch, means operable to place said automatic switch under control of said certain thermostatic switch, and certain other of said thermostatic switches directly controlling said motor.

7. A control system comprising a unit heat exchange means having air blast means and a motor for driving said blast means, an electric circuit for energizing said motor, a switch controlling said motor, a relay for actuating said switch, a thermostatic switch controlling said relay, a second thermostatic switch controlling said motor, said thermostatic switches each being operable both to make and break said motor circuit, and means operable to short-circuit one of said thermostatic switches.

8. A control system comprising a plurality of unit heat exchange means each having air blast means and a motor for driving said blast means, individual circuits for energizing each of said motors respectively, a thermostatic switch for opening and closing each of said circuits, means to supply current to all of said circuits, a switch for controlling said last-named means, and a thermostat for opening and closing said switch.

9. An apparatus for controlling air temperature, comprising a radiator, a fan for moving air into heating relation to said radiator, a motor connected to and for driving said fan, a thermostat responsive at relatively high minimum and maximum temperature limits to the temperature of the air to be heated, an electric switch operable by said thermostat and controlling said motor, a second thermostat responsive to the temperature of the air to be heated, an electric switch operable by said second-named thermostat and controlling said motor, said second-named thermostat acting to operate said second-named switch to start and stop said motor at relatively lower air temperatures than said first-named thermostat whereby said second-named thermostat is operable to stop said motor irrespective of said first-named thermostat, and means to place said first-named thermostat in control of said motor.

10. An apparatus for controlling air temperature, comprising a radiator, a fan for moving air relative to said radiator, a motor connected to and for driving said fan, a thermostat responsive at relatively high minimum and maximum temperature limits to the temperature of the air to be heated, an electric switch operable by said thermostat and controlling said motor, a second thermostat responsive to the temperature of the air to be heated, an electric switch in series circuit with said first-named switch and with said motor and controlling said motor, said second-named thermostat acting to operate said second-named switch to start and stop said motor at relatively lower air temperatures than said first-named thermostat whereby said second-named thermostat is operable to stop said motor irrespective of said first-named thermostat, and means to place said first-named thermostat in control of said motor.

11. An apparatus for controlling air temperature, comprising a radiator, a fan for moving air into heating relation to said radiator, a motor connected to and for driving said fan, an automatic electric switch controlling said motor, an electric switch for actuating said automatic switch, a thermostat responsive to air temperature and operable to actuate said second-named switch whereby to start and stop said fan motor, an electric switch in series circuit with said motor and with said automatic switch, a thermostat operable to actuate said third-named switch and responsive at relatively higher minimum and maximum air temperatures to start and stop said motor than the temperatures at which said first-named thermostat will start and stop said motor whereby said first-named thermostat will stop said motor irrespective of the operation of said second-named thermostat, and means to maintain said automatic switch closed whereby said second-named thermostat will control said motor.

12. An apparatus for controlling air temperature comprising a radiator, a fan for moving air into heating relation to said radiator, a motor connected to and for driving said fan, an automatic electric switch controlling said motor, an electric switch for actuating said automatic switch, a thermostat responsive to air temperature and operable to actuate said second-named switch whereby to start and stop said fan motor, an electric switch in series circuit with said second-named switch, a thermostat operable to actuate said third-named switch and responsive at relatively higher minimum and maximum air temperatures to start and stop said motor than the temperatures at which said first-named thermostat will start and stop said motor whereby said first-named thermostat will stop said motor irrespective of the operation of said second-named thermostat, and means to short circuit said second-named switch whereby said second-named thermostat will control said motor.

EARNEST J. DILLMAN.